United States Patent [19]
Maier

[11] Patent Number: 5,443,307
[45] Date of Patent: Aug. 22, 1995

[54] SLIP CONTROL SYSTEM FOR DRIVEN WHEELS

[75] Inventor: Rolf Maier, Kernen, Germany

[73] Assignee: Robert Bosch GmbH, Stuttgart-Feuerbach, Germany

[21] Appl. No.: 116,615

[22] Filed: Sep. 7, 1993

[30] Foreign Application Priority Data

Sep. 4, 1992 [DE] Germany .................. 42 29 560.2

[51] Int. Cl.⁶ .................. B60K 28/16; B60T 8/32
[52] U.S. Cl. .................. 303/169; 303/199; 364/426.03
[58] Field of Search ............ 303/95, 100, 103, 106, 303/110, 111; 180/197; 364/426.02, 426.03

[56] References Cited

U.S. PATENT DOCUMENTS

| | | | |
|---|---|---|---|
| 4,991,103 | 2/1991 | Lin | 303/106 X |
| 5,070,459 | 12/1991 | Van Zanten et al. | 303/100 X |
| 5,116,108 | 5/1992 | Sigl et al. | 303/103 |
| 5,155,686 | 10/1992 | Shiraishi et al. | 303/95 X |
| 5,164,902 | 11/1992 | Kopper et al. | 303/95 X |
| 5,233,529 | 8/1993 | Braschel et al. | 303/103 X |
| 5,255,194 | 10/1993 | Schaufelberger et al. | 303/95 X |
| 5,267,784 | 12/1993 | Müller et al. | 303/100 X |
| 5,277,482 | 1/1994 | Beyer et al. | 303/111 X |
| 5,281,008 | 1/1994 | Kawamura et al. | 303/100 |

FOREIGN PATENT DOCUMENTS 4030881 9/1990 Germany .

*Primary Examiner*—Josie A. Ballato
*Attorney, Agent, or Firm*—Spencer, Frank & Schneider

[57] ABSTRACT

A drive slip control system for the driven wheels of a motor vehicle is disclosed in which the differential is blocked by the action of the brakes. With the aid of the difference in the rate of rotation of the driven wheels and with the aid of the engine rpm a PID controller and a damping action generate signals that correspond to braking moments which are converted into valve control times and generate a brake pressure at a specific brake.

20 Claims, 2 Drawing Sheets

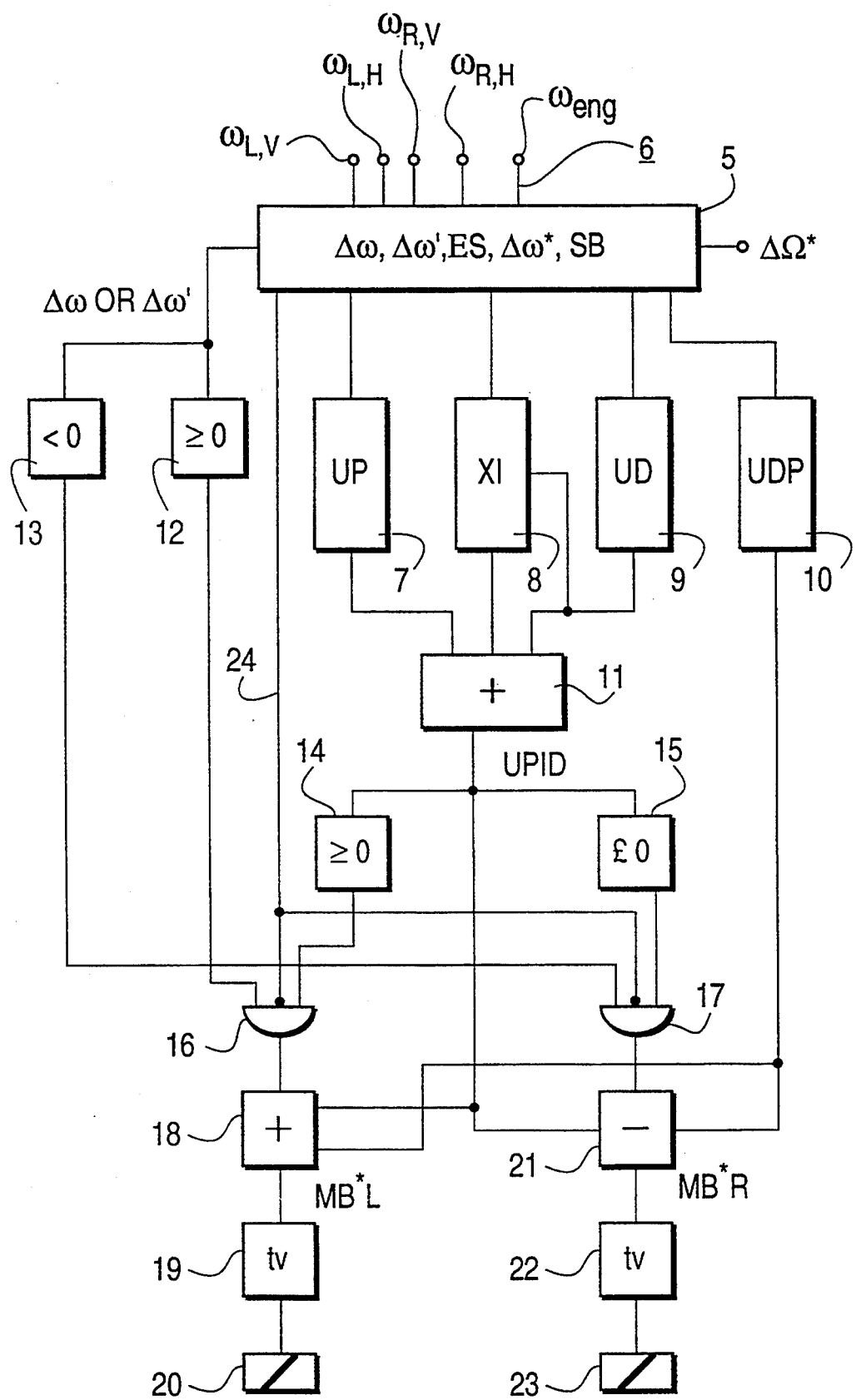

SLIP CONTROL SYSTEM FOR DRIVEN WHEELS

BACKGROUND OF THE INVENTION

German Published Patent Application DE-A1-4,030,881 discloses a slip control system for the driven wheels of a motor vehicle wherein the rotational velocities of the driven wheels $w_L$ and $w_R$ and the engine rpm $w_{eng}$ are determined and wherein a controller determines desired braking moments $M_{BL}^*$ and $M_{BR}^*$ for the driven wheels from the difference between the rotational velocities of the wheels $\Delta w = (w_L - w_R)$ and the engine rpm $w_{eng}$, with the desired braking moments being converted to valve actuation times for the brakes of these wheels. There, too, the same input values are employed and there, too, the difference $\Delta w$ between the rotational velocities of the driven wheels serve as a control criterion. Finally, the system disclosed there also includes an attenuation controller which co-processes the rate of rotation of the engine.

ADVANTAGES OF THE INVENTION

The present invention provides an improvement of the controller characteristics so that it results in an improvement of the blocking of the differential by the action of the brakes.

SUMMARY OF THE INVENTION

According to the invention, there is provided an anti-slip control system for the driven wheels of a motor vehicle which comprises: means for determining the rotational velocities of a left driven wheel $w_L$ and of a right driven wheel $w_R$, and an engine rpm $w_{eng}$; a controller for determining desired braking moments $M_{BL}^*$ and $M_{BR}^*$ for the right driven wheel and the left driven wheel from the difference $\Delta w = (w_L - w_R)$ between the rotational velocities of the driven wheels and the engine rpm $w_{eng}$; and means for converting the desired braking moments to valve actuation times for the brakes of these driven wheels, and for applying the valve actuation times to the respective wheel brakes of said driven wheels; and wherein the controller exhibits a control behavior uPID corresponding to the sum of a proportional component uP, an integral component xI and a differential component uD, and produces the desired braking moments according to the following braking rules:

(1) if $\Delta w > 0$ and $uPID \geq 0$, the wheel brake of the left driven wheel is charged with a brake pressure that corresponds to the desired braking moment $M_{BL}^* = uPID + uDP$;

(2) if $\Delta w < 0$ and $uPID \leq 0$, the wheel brake of the right driven wheel is charged with a brake pressure that corresponds to the desired braking moment $M_{BR}^* = -uPID + uDP$; and (3) if neither condition (1) nor (2) is met, no driven wheel is braked, where uDP is a damping action that is a function of the engine rpm $w_{eng}$ and of the selected vehicle gear $i_g$.

BRIEF DESCRIPTION OF THE DRAWINGS

One embodiment of the invention will now be described with reference to the drawing figures, in which:

FIG. 2 is a more detailed block circuit diagram; and

DETAILED DESCRIPTION OF THE PREFERRED EMBODIMENT

Figure 1:
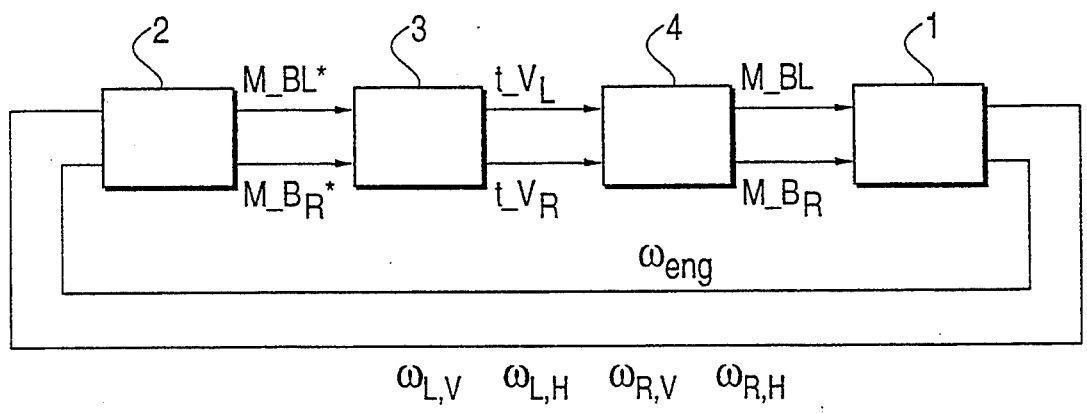
FIG. 1 is a block circuit diagram of the control circuit.

FIG. 1 shows a vehicle 1 at which the four wheel velocities $w_{LV}$, $w_{LH}$, $w_{RV}$ and $w_{RH}$, for the left front, left rear, right front and right rear wheels, respectively, as well as the engine rpm $w_{eng}$ are measured. These measured values are fed to a braking moment controller 2 which generates desired braking moments $MB_L^*$ and $MB_R^*$. A valve actuating block 3 converts these desired braking moments into valve actuation times $t_{VL}$ and $t_{VR}$. During these actuation times, for example, a 3/3 valve in a hydraulic unit 4 is directed into a pressure build-up position or a pressure reducing position and thus the braking pressure at the brakes of the driven wheels is regulated so that braking moments $MB_L$ and $MB_R$, respectively, are produced at vehicle 1.

FIG. 2 is a block circuit diagram for the controller 2 and the valve actuation block 3. A block 5 receives by way of terminals 6, the four wheel velocities and the engine rpm. Block 5 then forms the difference between the number of revolutions of the driven wheels $\Delta w = (w_L - w_R)$ and the filtered rpm difference $\Delta w'$.

Block 5 is connected to a PID brake controller which includes a proportional controller 7, an integral controller 8, a differential controller 9 and an attenuation branch 10.

The desired braking moments are determined from the components of the PID controller and the damping action. If the controller is modified, this permits the addition, without problems, of desired braking moment components from additional controller modules (for example, for the simultaneous breaking of both driven wheels).

The components of the PID controller are combined in a block 11 as follows:

$$u\,PID = u\,P + x\,I + u\,D$$

Three cases can be distinguished:

(1) if w or preferably $\Delta w' > 0$ and u PID $> 0$ are met, the left wheel is braked:
   $M\,B_L^* = u\,PID + u\,DP,\ M\,B_R^* = 0$;

(2) if w or preferably $\Delta w' < 0$ and u PID $\leq 0$ are met, the right wheel is braked:
   $MB_L^* = 0,\ M\,B_R^* = -u\,PID + u\,DP$;

(3) otherwise no wheel is braked:
   $M\,B_L^* = 0,\ M\,B_R^* = 0$.

This is realized in FIG. 2 for case (1) by a comparator 12 ($\Delta w$ or $w' \geq 0$), a comparator 14 (UPID $> 0$) and an AND gate 16, an adder 18, a valve actuation unit 19 and a 3/3 valve 20. If the two conditions are met, the output signal of AND gate 16 activates adder 18 which then forms $MB_L^*$ from the outputs of adder 11 and branch 10. In a block 19, the output signal of adder 18 is converted into a valve actuation time for valve 20, with the time being of such a length that a pressure corresponding to the desired braking moment is set at the brake.

For case (2) corresponding blocks 13, 15, 17 and 21 to 23 are provided.

In case (3) the valves are not actuated.

The configuration of the brake controller and its branches will now be discussed.

Figure 3:
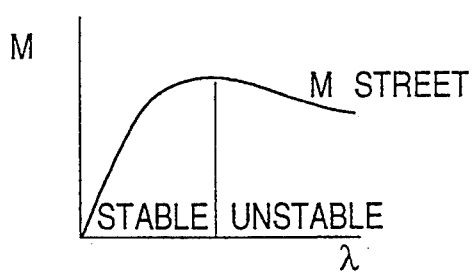
FIGS. 3 and 4 are explanatory diagrams.

In the ascending branch of the slip ($\lambda$) curve (FIG. 3), the wheel exhibits a stable behavior; a relatively small excursion of the braking moment results in only a slight change in slip or rpm. In the descending branch or in the horizontal branch of the slip curve, however, the wheel is unstable; a relatively small excursion of the braking moment results in a great change in slip or rpm.

The control path is therefore not linear. Moreover, because of the influence of the engine, the parameters of the control path are a function of the selected gear. These nonlinearities are considered by corresponding nonlinearities in the PID controller. For this purpose, the respective operating state must be determined. This is done in block 5.

As will be shown later, it must be known which gear is presently employed. This can be done by the following procedure.

The engine rpm $w_{eng}$ and the rotational velocity of the drive shaft $w_k = (w_L + w_R)/2$ are each filtered in a lowpass filter:

$$w'eng_{t+1} = ag * w' eng_t + (1-ag) * w_{eng}$$

$$w'k_{t+1} = ag * w' K_t + (1-ag) * w_k$$

where "ag" is a filter constant which is, for example, 0.9. The gear transmission ratio of the $i^{th}$ driving stage is called $i_g(i)$.

A counter i advances in increments $i = i+1$ until the following results:

$$|w' eng_t/i_g(i) - w' k_t| < \epsilon 4$$

For driving stage FS the following then applies: FS = i. The value $\epsilon 4$ is a threshold value (e.g., 4). The described procedure takes place in block 5 as does the detection of an engine drag or braking moment. The controller must be turned off if a driven wheel is in slip during engine braking.

The longitudinal velocity of the vehicle converted to the rotational velocity of the wheel is marked $w_{ref}$ and can be calculated as follows:

$$w_{ref} = (w_{L, NA} + w_{R, NA})/2$$

where $w_{L, NA}$ and $w_{R, NA}$ stand for the rotational velocities of the non-driven wheels.

Engine drag or braking operation SB is detected if the following applies:

$$(\min(w_L, w_R)w_{ref})/(w_{ref} + \epsilon 5) < -\epsilon 6$$

where $\epsilon 5$ and $\epsilon 6$ are again threshold values (e.g. $\epsilon 5 = 1$; $\epsilon 6 = 0.2$). If the condition is met, AND gates 16 and 17 are blocked, for example, by way of a line 24 and thus the control unit is switched off. In block 5 the desired value for the rpm difference is also adapted to the vehicle speed and to a minimum engine rpm. The engine will not die if it is driven too slowly (e.g., started in second gear) as long as the minimum engine rpm is maintained.

The given value $\Delta\Omega^* m(w_{ref})$ (e.g., 5) can be adapted to the respective vehicle type. Using the minimum engine rpm w $eng_{min}$ (FS) converted to the rotational velocity of the wheel and thus a function of the driving stage, the desired differential velocity value $\Delta w^*$ is calculated as follows:

$$\Delta w^* = \max[\Delta\Omega^* m(w_{ref}), 2 *$$

$$(w\ eng_{min}(FS) - \min(w_L, w_R))]$$

For the above reasons, the dynamics of the control path are determined to a great degree by whether the high-$\mu$ wheel lies on the stable or the unstable branch of the slip curve. Therefore, different sets of control parameters are employed for the two cases:

(1) high-$\mu$ wheel is unstable; and (2) high-$\mu$ wheel is stable.

This distinction is not necessary for the low-$\mu$ wheel because it is normally disposed in the unstable branch of the slip curve. The detection of state (1) is realized in block 5 by the following process: a lowpass filter is provided which corresponds to the following relationship:

$$y\ s_{t+1} = as * y\ s_t + (1-as) * \min$$

$$(w_L - w_{L, NA}, w_R - w_{R, NA}),$$

where "as" is a filter constant and is, for example, 0.8.

Case (1) and thus unstable = 1 is detected if $$y\ s_{t+1} > \epsilon 7$$

where $\epsilon 7$ is a threshold value, for example 2; otherwise the condition is unstable = 0.

Due to inherent elasticities, the drive train tends to vibrate in a frequency range of 8 to 12 Hz. A damping action is intended to take care that such vibrations are not initiated by action of the controller.

For damping action the damping controller disclosed in DE-A1 4,030,881 is supplemented only by two dead time or delay members. The dead time or delay members take care that the damping action occurs in the correct phase position: uDP is formed as follows in branch 10:

$$uDP = k\ DP^* (w\ eng_{t-Tdead/T}/i_g(FS) - w$$

$$k_{k-Tdead/T})$$

where w eng and FS = $i_g$ are furnished by block 5.

A dead time or delay member is composed of Tdead/Tsample memories where, for example, the dead time or delay is 60 ms, the sampling time is 20 ms. Three memories are employed; with the first memory containing the old value originating from the preceding sampling step and the second memory contains the old value of the first memory, etc.

The value of the first memory is thus 20 ms "old", the value of the second memory is 40 ms "old" and the value of the third memory is 60 ms "old".

The P component uP of the controller serves primarily to stabilize the control circuit; it is formed in branch 7 where the difference rpm $\Delta w = w_L - w_R$ from block 5 at unstable = 0 is filtered through a lowpass filter in order to avoid the excitation of vibrations. The following then applies:

$$w'_{t+1} =$$

$$\begin{cases} aP^* \Delta w'_t + (1 - aP) * \Delta w_t & \text{for high} - \mu \text{ wheel unstable} = 0 \\ \Delta w_{t+1} & \text{for high} - \mu \text{ wheel unstable} = 1 \end{cases}$$

If the wheel is not braked enough, greater deviations occur due to the nonlinearity of the slip curve than if it is braked too much. This is considered in the P component by two different amplification factors, namely k P1 (for the insufficiently braked wheel) and k P2 (for the excessively braked wheel). Both controller parameters are a function of the driving stage FS and of the unstable state. The amplification factor k P2 is additionally a function of the integrator state x I as follows:

$$k\ P2 = k\ P2\ (FS, unstable, x\ I)$$

For example, k P2 may be selected so that $$k\ P2 = 0\ \text{for}\ |x\ I| < \epsilon 8$$

where $\epsilon 8$ is a threshold value, for example, 200.

The P component is calculated as follows:

$$k\ P1\ (FS) * (|\Delta w'_t| - \Delta w^*)\ \text{sign}\ (\Delta w^*)\ \text{for}\ |\Delta w'_t| > \Delta w^*$$

$$u\ P = k\ P2\ (FS, x\ I) * (|\Delta w'_t| - \Delta w^*)\ \text{sign}\ (\Delta w^*)\ \text{for}\ |\Delta w'_t| < \Delta w^*$$

where $\pm \Delta w$ and $\pm \Delta w^*$ come from block 5.

The D component improves the phase position of the controller.

During the difference formation of the rotational velocity of the wheels, the desired signal is considerably falsified by the above-mentioned wheel vibrations. The rotational acceleration of the wheel is therefore highly filtered in conventional differentiators which is connected with a great shift in phase.

Figure 4:
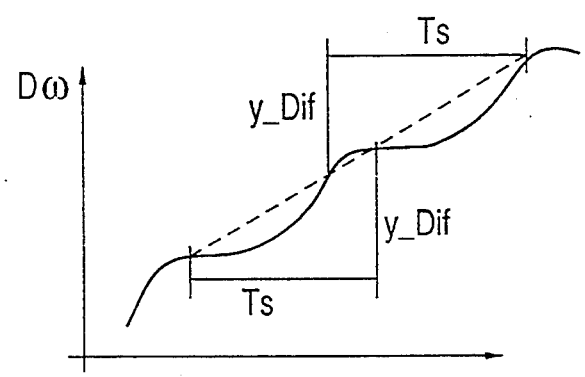

The interference from wheel vibrations is relatively small if the rotational velocity of the wheel preceding in time by vibration duration $T_s$ is subtracted from the momentary rotational velocity of the wheel. This is shown in the diagram of FIG. 4.

If $T_s$ is a multiple of the sampling interval of the computer, the following is obtained:

$$y\ D_t = \Delta w_t - \Delta w_{t-Ts/T}$$

$\Delta w_t \pm T_s$ and $w_t + T_s$ must be stored in each case. $\Delta w_{t-Ts/T}$ must also be stored in a dead time member. y D will also be used later for the calculation of the integrator state x I.

The following results for the D component:

$$u\ D = k\ D * y\ D$$

where kD is an amplification factor, for example, 10. This process takes place in branch 9.

The I component x I is formed in branch 8 and sets the stationary end value for the braking moment.

Analogously to the P component (7), there are two different amplification factors k I1 for $|\Delta w| \geq \Delta w^*$ and k I2 for $|\Delta w| < \Delta w^*$. Both controller parameters are again a function of FS and the unstable state.

Two cases are distinguished for $|\Delta w| > \Delta w^*$:

If, in addition, the conditions $-|yD| * \text{sign}(\Delta w) > y\ D_{min}$ and $|\Delta w| < \epsilon 9$ are met, the following applies:

(1) $x\ I_{t+1} = x\ I_t * [y\ D - y\ D_{min} * \text{sign}\ (\Delta w)]$; otherwise the following applies:

(2) $x\ I_{t+1} = x\ I_t + \min(k\ I1 * (|\Delta w| - \Delta w^*), \Delta x_{max}) \cdot \text{sign}(\Delta w)$ where y D comes from branch 9; k I1 and k I2 are, for example, 0.1 and 0.6, respectively.

$y\ D_{min}$ is a fixed value, namely an application parameter, for example, 2.

If $|\Delta w| \leq \Delta w^*$, there are again two distinguishable cases:

If additionally the following conditions are met:

$$\Delta w| < \epsilon 10\ \text{and}\ |\Delta w'| < \epsilon 10,\ \text{then}$$

(3) $x\ I_{t+1} = a\ I * x\ I_t$ otherwise (4) $x\ I_{t+1} = x\ I_t + k\ I2 * (\Delta w^* - |\Delta w|) * \text{sign}(|\Delta w|)$ Unfavorable initial integrator states are avoided by $$x\ I_{t+1} \max(|x\ I_{t+1}|, k\ I_{init} * |u\ P|) * \text{sign}(u\ P)$$

$\epsilon 10$ is again a threshold value, for example, 0.1; aI is a filter constant, for example, 0.9.

The conversion of the desired braking moments into valve actuation times in blocks 19 and 22 will be described in greater detail in the paragraphs below. These blocks serve the purpose of compensating a control of the dynamics of the hydraulic brake system so that these dynamics need not be explicitly considered in the development and design of the braking moment controller.

In the hydraulic system, the valve opening times are integrated with the wheel brake pressure and wheel braking moment, respectively. Conversely, in the valve actuation unit, the valve opening time is determined from the desired moment; the valve actuation unit thus acts as a differentiator which compensates for the integrating effect of the hydraulic system.

The speed with which the pressure in wheel brake cylinder changes is a nonlinear function of the pressure:

$$dp/dt = f(P)$$

This nonlinearity is compensated in that the valve opening time is calculated as a function of an estimated pressure p d.

The desired pressure p* is calculated from the input value of the desired braking moment M B*:

$$p^* = M\ B^*/c\ hyd$$

where c hyd is the ratio between the braking moment and the brake pressure, a ratio that is constant for a vehicle. For the valve opening time t v which is calculated by the control algorithm, the following applies:

t v < 0: pressure reduction
t v = 0: pressure retention
t v > 0: pressure buildup The values of t v are limited to multiples of the minimum valve opening time $t_{min}$, and the sampling interval T, which is the maximum permissible valve opening time, must also be a multiple of $t_{min}$, as follows:

$$t\ v = -T, \ldots, -2\ t_{min}, -t_{min}, 0, t_{min}, \ldots, T$$

The increase in pressure $$\Delta p_{up}\ (p\ d) = dp/dt|_{p\ d} * t_{min}$$

with reference to the time unit $t_{min}$ is stored in a one-dimensional characteristic field $\Delta p_{up}\ (p\ d)$ for equidistant values of p d. Analogously, $\Delta p_{down}(p\ d)$ includes the values for pressure reduction.

The ROM (read only memory) requirement of $\Delta p_{up}(p\ d)$ and $\Delta p_{down}(p\ d)$ can be reduced if the relatively smooth functions are calculated by linear interpolation between a few support locations or if one approximates them by means of an analytical function. However, these measures result in greater computing times and an additional ROM requirement for the calculations.

The following five cases are distinguished in the determination of t v:

(1) low desired pressure: $p^* < \epsilon 1 \rightarrow t\ v = -T$ ($\epsilon 1$, e.g. 1);

(2) high desired pressure: $p^* > p$ earlier than $-\epsilon 2 \rightarrow t\ v = T$ ($\epsilon 2$, e.g. 1);

(3) dead zone with small pressure deviation:

$$|p^* - p\ d| < \epsilon 3 \rightarrow t\ v = 0\ (\epsilon 3, \text{ e.g. } 2);$$

(4) pressure buildup: $p^* > p\ d + \epsilon 3$ the estimated pressure $p\ d_t$ is integrated until $$p\ d_{t+1} = p\ d_t + p_{up}(p\ d)$$

and counter t advances in increments,
$K = K+1$; where K is the counter state until either $p\ d_t > p^*$ or $t\ v = t = t+1 * t_{min} > T$ is met. In the case of $$p^* - p\ d_{t+1} < p\ d_t - p^*$$

the previously estimated value $$p\ d = p\ d_{t-1}$$

applies as well as the previous valve opening time $$t\ v = (K-1) * t_{min};$$

(5) pressure reduction: $p^* < p\ d - \epsilon 3 \rightarrow$
The estimated pressure $p\ d_t$ is integrated $$p\ d_{t+1} = p\ d_t + \Delta p_{down}\ (p\ d)$$

and counter t is incremented $$K = K+1$$

until either $p\ d_t \leq p^*$ or $t\ v = -K * t_{min} \leq -T$ are met. In the case of $$P\ d_{t+1} - p^* < p^* - p\ d_t$$

the previously estimated value $$p\ d = p\ d_{t-1}$$

applies as well as the previous valve opening time $$t\ v = -(K-1) * t_{min}.$$

In this valve opening time calculation method no "inverse" hydraulic model is required.

The following is a description of the modifications for four-wheel drive:

The rotational velocity w k of the drive shaft is then formed as follows from an average of all four wheel rotational velocities:

$$w\ k = (w_{L,\ V} + w_{L,\ H} + w_{R,\ V} + w_{R,\ H})/4$$

For four-wheel drive vehicles the reference velocity $w_{ref}$ can be estimated only with great difficulty. Therefore, a stability determination dispenses with $w_{ref}$. The high-$\mu$ wheel is determined to be unstable (instability=1) if it changes its rotational velocity often or considerably over a time period $T^* (k+1)$, that is, if:

$$|w_{i,t} - w_{i,t-1}| + |w_{i,t-1} - w_{i,t-2}| + \ldots + |w_{i,t-k} - w_{i,t-k-1}| > \epsilon 11$$

where i=L for $\Delta w < 0$ and i=R for $\Delta w > 0$.

The above described PID controller is employed without modification for controlling the differential rpm of the front or rear wheels, respectively.

For a longitudinal block, a $PT_1$ controller is employed which has a dead zone (Lose) $\Delta w\ L_{t+1}$ as follows $$\Delta w\ L_{t+1} = a\ L * \Delta w\ L_t + (1 - a\ L)$$
$$(w_{L,V} + w_{R,V} - w_{L,H} - w_{R,H})/2,$$

and which has an output which is $$u\ L = k\ L * \max(|\Delta w\ L| - \epsilon 12, 0) * \text{sign}(\Delta w\ L)$$

where $a_L$ is a filter constant (e.g., 0.5), $\epsilon 12$ is a threshold value (e.g., 1), and k L is, e.g., 30.

The rpm difference controller according to the present invention can be modified relatively easily into a complete Anti-Slip Control (ASC or ASR) system if the drive shaft rpm is controlled by action of the engine.

| Table of the Most Important Symbols of the Equations | |
|---|---|
| a ... | filter constants |
| c hyd | ratio of braking moment / brake pressure |
| $\epsilon$ ... | threshold values |
| FS | driving stage |
| $i_g$ | speed increasing ratio |
| unstable | flag to indicate the stability of the high-$\mu$ wheel |
| k ... | amplification factors |
| M B | braking moment |
| M B* | desired braking moment |
| p | brake pressure |
| p* | desired pressure |
| $\Delta p_{down}$ | performance characteristics for pressure reduction |
| $\Delta p_{up}$ | performance characteristics for pressure buildup |
| p d | estimated pressure |
| T | sampling time |
| T s | duration of vibrations |
| t | time or time index, respectively |
| $t_{min}$ | minimum valve opening time |
| t v | valve opening time |
| u ... | controller components |
| x I | integrator state |
| $\Delta x_{max}$ | maximum integrator increase |
| y Dif | differentiator output |
| $\Delta \Omega^{**}$ | given desired value |
| w | rotational velocity of wheel |
| $\Delta$w | differential velocity |
| $\Delta$w* | desired differential velocity |
| w k | rotation rate of drive shaft |
| w eng | engine rpm |
| w eng$_{min}$ | minimum engine rpm |
| $w_{ref}$ | reference speed |
| Indices: | |
| H | rear |
| L | left |
| NA | not driven |
| R | right |
| t | time step |
| V | front |
| ' | filtered |

It will be understood that the above description of the present invention is susceptible to various modifications, changes and adaptations, and the same are intended to be comprehended within the meaning and range of equivalents of the appended claims.

What is claimed is:

1. A slip control system for the driven wheels of a motor vehicle comprising: means for determining the rotational velocities of a left driven wheel $w_L$ and of a right driven wheel $w_R$, and an engine rpm $w_{eng}$; a controller for determining desired braking moments $M_{BL}^*$ and $M_{BR}^*$ for the right driven wheel and the left driven wheel from the difference between the rotational velocities of the driven wheels $w=(w_L-w_R)$ and the engine rpm $w_{eng}$; and means for converting said desired braking moments to valve actuation times for the brakes of these driven wheels, and for applying the valve actuation times to the respective wheel brakes of said driven wheels; and wherein said controller exhibits a control behavior uPID and includes a proportional component uP, an integral component xI and a differential component uD, and produces the desired braking moments according to the following braking rules:

(1) if $w>0$ and uPID $\geq 0$, the wheel brake of the left driven wheel is charged with a brake pressure that corresponds to the desired braking moment $M_{BL}^*=$uPID$+$uDP;

(2) if $w<0$ and uPID $\leq 0$, the wheel brake of the right driven wheel is charged with a brake pressure that corresponds to the desired braking moment $M_{BR}^*=-$uPID$+$uDP; and (3) if neither condition (1) nor (2) is met, no driven wheel is braked, where uDP is a damping action that is a function of the engine rpm $w_{eng}$ and of a selected vehicle gear $i_g$.

2. A slip control system as defined in claim 1 wherein said controller further includes means for determining whether a high-$\mu$ wheel is in the stable range of a vehicle $\mu$-slip curve and, as long as the high-$\mu$ wheel is in the stable range of the vehicle $\mu$-slip curve, for replacing w by a filtered w' derived according to the following relationship for the filtering:

$$w'_{t+1}=aP\ w'_t+(1-aP)\ w_t$$

with t being the time and aP being a filter constant.

3. A slip control system as defined in claim 2, wherein said means for determining whether the high-$\mu$ wheel is in the stable range of the vehicle $\mu$-slip curve forms a term $$ys_{t+1}=as\ ys_t+(1-as)\cdot min\ (w_L-w_{L,NA}, w_R-w_{R,NA})$$

in order to detect instability, and detects instability if $ys_{t+1}$ is greater than a predetermined value, with "as" being a filter constant.

4. A slip control system as defined in claim 2, wherein the controller forms the P component uP according to the following:

uP$=$kP1 (FS) $*$ ($|w'_t|-w^*$) sign ($w^*$) for $|w'_t|\geq w^*$
uP$=$kP2 (FS,x I) $*$ ($|w'_t|-w^*$) sign ($w^*$) for $|w'_t|<w^*$ where kP1 and kP2 are different amplification factors which are both a function of the selected gear of the driving stage FS, kP2 is additionally a function of the integral component xI, and $w^*$ is the desired value for the difference in rotational velocity of the driven wheels.

5. A slip control system as defined in claim 4, wherein the desired value $\Delta w^*$ for the rotational velocity difference is determined by the following equation:

$$\Delta w^*=\max\ [\Delta\Omega^*\ (w_{ref}), 2*(w_{eng,min}(FS)-\min(w_L w_R))]$$

where $\Delta\Omega^*\ (w_{ref})$ is a given value that is a function of the reference speed and of the type of vehicle, and $w_{eng,\ min}$ is the minimum engine rpm which is a function of the driving stage FS.

6. A method of controlling slip for the driven wheels of a motor vehicle as defined in claim 2, including forming the proportional component uP in the controller according to the following:

uP$=$kP1 (FS) $*$ ($|\Delta w'_t|-\Delta w^*$) sign ($\Delta w^*$) for $|\Delta w'_t|>\Delta w^*$
uP$=$kP2 (FS,x I) $*$ ($|\Delta'_t|-\Delta w^*$) sign ($\Delta w^*$) for $|\Delta w'_t|<\Delta w^*$ where kP1 and kP2 are different amplification factors which are both a function of the selected gear of the driving stage FS, kP2 is additionally a function of the integral component xI, and $\Delta w^*$ is the desired value for the difference in rotational velocity of the driven wheels.

7. A method of controlling slip for the driven wheels of a motor vehicle as defined in claim 6, including determining the desired value $\Delta w^*$ for the rotational velocity difference by the following equation:

$$\Delta w^*=\max\ [\Delta\Omega^*\ (w_{ref}), 2*(w_{eng\ min}(FS)-\min(w_L w_R))]$$

where $\Delta\Omega^*(w_{ref})$ is a given value that is a function of the reference speed and of the type of vehicle, and $w_{eng,\ min}$ is the minimum engine rpm which is a function of the driving stage FS.

8. A slip control system as defined in claim 1, wherein the controller forms the differential component uD according to the following:

$$uD=kD*yD$$

where kD is an amplification factor, and yD is the output signal of a differentiator which is defined by the following relationship:

$$yD=\Delta w_t-\Delta w_{t-TS/T}$$

where $w_{t-TS/T}$ is the difference in reference to the point in time preceding by $T_S$, $T_S$ is a multiple of the sampling interval T of the controller, and $T_S$ is the duration of a wheel vibration.

9. A slip control system as defined in claim 1, wherein the controller forms integral component xI according to the following conditions:

(1) $xI_{t+1}=xI_t*[yD-yD_{min}*sign\ (w)]$ if $|w|>w^*$ and $-|yD|*sign\ (w)>yD_{min}$ and $|w|<\epsilon 9$ (2) $xI_{t+1}=xI_t+\min\ (kI1*(|w|-w^*), x_{max})*sign\ (\Delta w)$ if $|\Delta w|>\Delta w^*$ and the two other conditions of (1) are not met;

(3) $xI_{t+1}=aI*xI_t$ if $|\Delta w|<\Delta w^*$ and $|\Delta w|<\epsilon 10$ and $|\Delta w'|<\epsilon 10$ and (4) $xI_{t+1}=xI_t+kI2*(\Delta w^*-|\Delta w|)*sign\ \Delta w$ if $(\Delta w)<\Delta w^*$ and the other conditions of (3) are not met, where $yD_{min}$ is an application parameter, $\epsilon 9$ and $\epsilon 10$ are given threshold values, kI1 and kI2 are different amplification factors, $\Delta w^*$ is the desired value for the difference in rotational velocity of the driven wheels, and aI is a filter constant.

10. A slip control system as defined in claim 1, wherein the controller obtains damping action uDP according to the following relationship:

$$uDP = kDP * (w_{eng\ t-Tdead/T}/i_g - wk_{t-Tdead/T})$$

where kDP is an amplification factor, $wK = (w_L + w_R)/2$ is the rate of rotation of the vehicle drive shaft and the term $t - T_{dead/T}$ means that the measurement of $W_{eng}$ and $w_k$, respectively, occurred earlier by the delay time $T_{dead}$ in that $w_{eng}$ and $w_k$ are stored intermediately $T_{dead/T}$ times.

11. A slip control system as defined in claim 10 wherein a lowpass filtered engine rpm $w'_{eng}$ and a lowpass filtered drive shaft rotation rate $w'K$ are obtained and the driving stage $FS = i$ is found by incrementing i until the following relationship applies:

$$|w'_{eng,t}/i_g(i) - w'K_t| < \epsilon 4,$$

where $\epsilon 4$ is a threshold value.

12. A slip control system as defined in claim 1, wherein the controller is switched off if there is a slip during an engine drag moment.

13. A slip control system as defined in claim 12, wherein the engine drag moment is detected if the following applies:

$$(\min(w_L, w_R) - w_{ref})/(w_{ref} + \epsilon 5) < \epsilon 6$$

where $w_{ref} = (w_{L,NA} + w_{R,NA})/2$, $\epsilon 5$ and $\epsilon 6$ are threshold values, and NA means not driven.

14. A slip control system as defined in claim 1, wherein the vehicle is a four-wheel drive vehicle, the average of all rotational wheel velocities serves as the drive shaft rotation rate $w_K$, and instability of the high-$\mu$ wheel is detected if said wheel changes its rotational velocity often and greatly within a time period.

15. A method of controlling slip for the driven wheels of a motor vehicle comprising the steps of: determining rotational velocities of a left driven wheel $w_L$ and of a right driven wheel $w_R$, and an engine rpm $w_{eng}$; feeding the determined velocities and engine rpm to a controller exhibiting a control behavior uPID, and including a proportional component uP, an integral component xI and a differential component uD; in the controller, determining desired braking moments $M_{BL}^*$ and $M_{BR}^*$ for the left and right driven wheels from the difference between the rotational velocities of the driven wheels $\Delta w = (w_L - w_R)$ and the engine rpm $w_{eng}$ according to the following braking rules:

(1) if $\Delta w > 0$ and $uPID > 0$, the left driven wheel is charged with a brake pressure that corresponds to the desired braking moment $M_{BL}^* = uPID + uDP$;

(2) if $\Delta w < 0$ and $uPID < 0$, the right driven wheel is charged with a brake pressure that corresponds to the desired braking moment $M_{BR}^* = -uPID + uDP$; and (3) if neither condition (1) nor (2) is met, no driven wheel is braked, where uDP is a damping action that is a function of the engine rpm $w_{eng}$ and of a selected vehicle gear $i_g$;

converting said desired braking moments to valve actuation times for the brakes of these driven wheels; and applying the valve actuation times to the respective brakes of the driven wheels.

16. A method of controlling slip for the driven wheels of a motor vehicle as defined in claim 15 further comprising, for as long as a high-$\mu$ driven wheel is in a stable range of a vehicle $\mu$-slip curve, replacing $\Delta w$ by a filtered $\Delta w'$ derived according to the following relationship for the filtering:

$$w'_{t+1} = aP\ \Delta w'_t + (1 - aP)\ \Delta w_t$$

where t is the time and aP is a filter constant.

17. A method of controlling slip for the driven wheels of a motor vehicle as defined in claim 16, further comprising detecting instability by forming a term $$ys_{t+1} = as\ ys_t + (1-as) \cdot \min(w_L - w_{L,NA}, w_R - w_{R,NA})$$

and indicating instability if $yst_{t+1}$ is greater than a predetermined threshold value, where "as" is a filter constant.

18. A method of controlling slip for the driven wheels of a motor vehicle as defined in claim 15, including forming the differential component uD in the controller according to the following:

$$uD = kD * yD$$

where kD is an amplification factor, and yD is the output signal of a differentiator which is defined by the following relationship:

$$yD = \Delta w_t - \Delta w_{t-TS/T}$$

where $w_{t-TS/T}$ is the difference in reference to the point in time preceding by $T_s$, $T_s$ is a multiple of the sampling interval T of the computer, and $T_s$ is the duration of a wheel vibration.

19. A method of controlling slip for the driven wheels of a motor vehicle as defined in claim 15, including determining the integral component xI according to the following conditions:

(1) $xI_{t+1} = xI_t * [yD - yD_{min} * \text{sign}(\Delta w)]$ if $|\Delta w| > \Delta w^*$ and $-|yD| * \text{sign}(\Delta w) > yD_{min}$ and $|\Delta w| < \epsilon 9$ (2) $xI_{t+1} = xI_t + \min(kI1 * (|\Delta w| - \Delta w^*), \Delta x_{max}) * \text{sign}(\Delta w)$ if $|\Delta w| > \Delta w^*$ and the two other conditions of (1) are not met;

(3) $xI_{t+1} = aI * xI_t$ if $|\Delta w| < \Delta w^*$ and $|\Delta w| < \epsilon 10$ and $|\Delta w'| < \epsilon 10$ and (4) $xI_{t+1} = xI_t + kI2 * (\Delta w^* - |\Delta w|) * \text{sign}\ \Delta w$ if $(\Delta w) < \Delta w^*$ and the other conditions of (3) are not met, where $yD_{min}$ is an application parameter, $\epsilon 9$ and $\epsilon 10$ are given threshold values, kI1 and kI2 are different amplification factors, $\Delta w^*$ is the desired value for the difference in rotational velocity of the driven wheels, and aI is a filter constant.

20. A method of controlling slip for the driven wheels of a motor vehicle as defined in claim 15, including obtaining the damping action uDP component in the controller according to the following relationship:

$$uDP = kDP * (w_{eng\ t-Tdead/T}/i_g - wk_{t-Tdead/T})$$

where kDP is an amplification factor, $wK = (w_L + w_R)/2$ is the rate of rotation of the vehicle drive shaft and the term $t - T_{dead/T}$ means that the measurement of $w_{eng}$ and $w_k$, respectively, occurred earlier by the delay time $T_{dead}$, where t is the time and T is the sampling interval.

* * * * *